April 12, 1960  D. A. HARRIS  2,932,419
HOSE CONTROL ARRANGEMENT
Filed Jan. 18, 1957  4 Sheets-Sheet 1

INVENTOR.
DONALD A. HARRIS
BY
Buckhorn, Cheatham and Blore
ATTORNEYS

April 12, 1960
D. A. HARRIS
2,932,419
HOSE CONTROL ARRANGEMENT
Filed Jan. 18, 1957
4 Sheets-Sheet 2
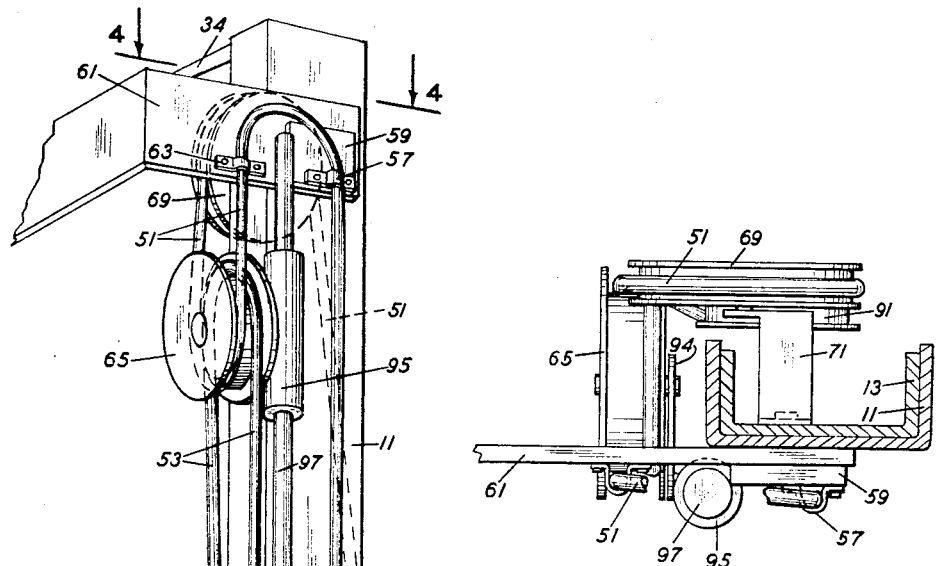
FIG. 4
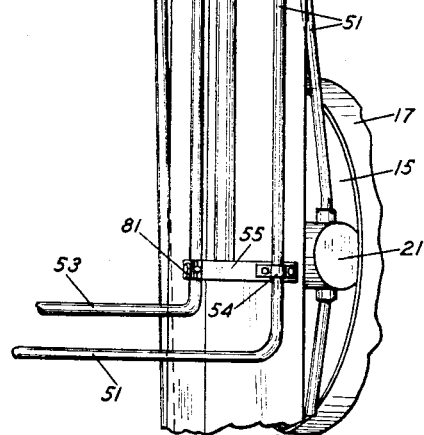
FIG. 3
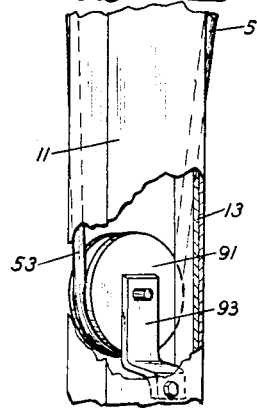
INVENTOR.
DONALD A. HARRIS
BY
Buckhorn, Cheetham and Blore
ATTORNEYS April 12, 1960 D. A. HARRIS 2,932,419
HOSE CONTROL ARRANGEMENT
Filed Jan. 18, 1957 4 Sheets-Sheet 3
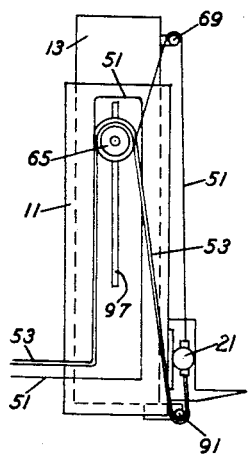
FIG. 5
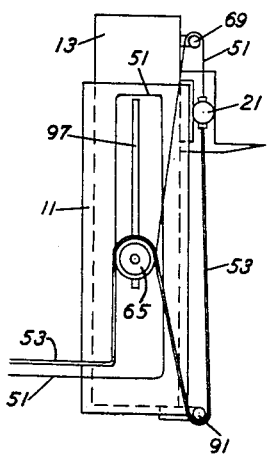
FIG. 6
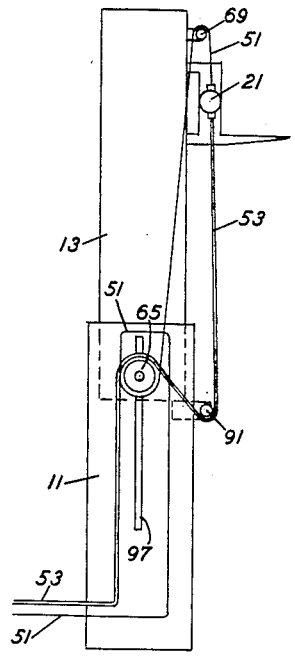
FIG. 7
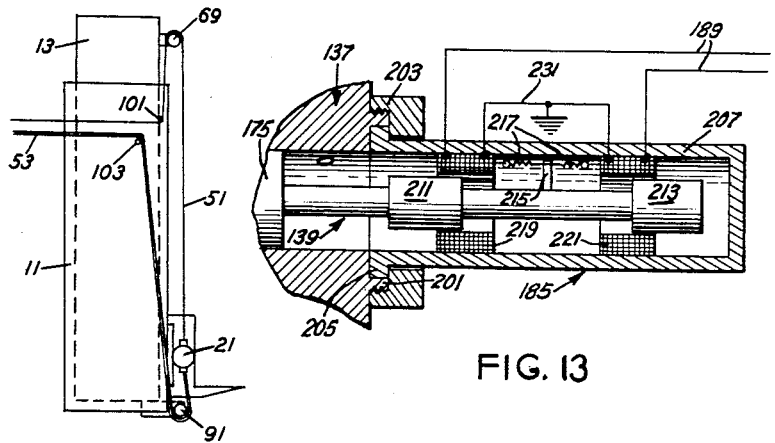
FIG. 8
FIG. 13
INVENTOR.
DONALD A. HARRIS
BY
Buckhorn, Cheatham and Olore
ATTORNEYS April 12, 1960
D. A. HARRIS
2,932,419
HOSE CONTROL ARRANGEMENT
Filed Jan. 18, 1957
4 Sheets-Sheet 4
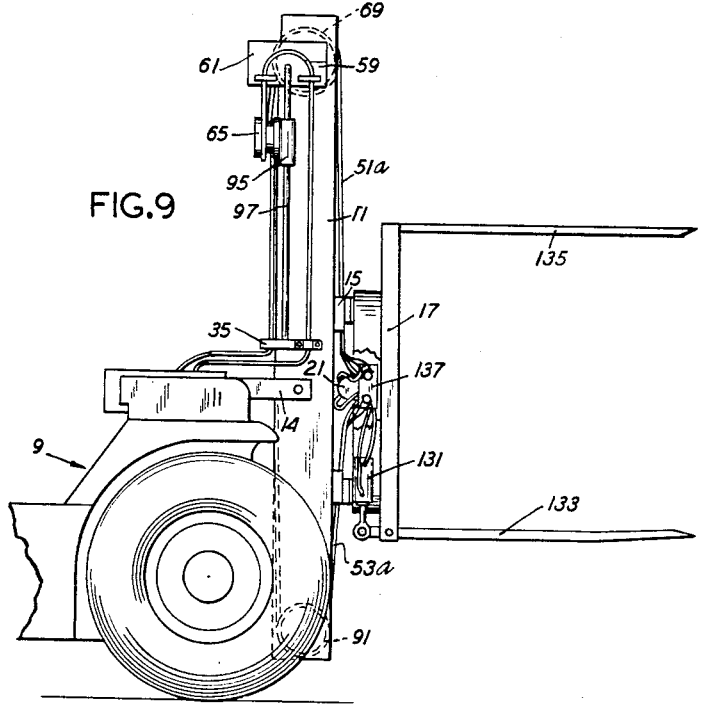
FIG. 9
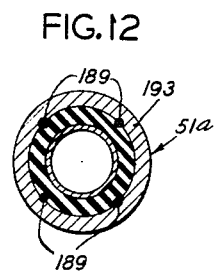
FIG. 12
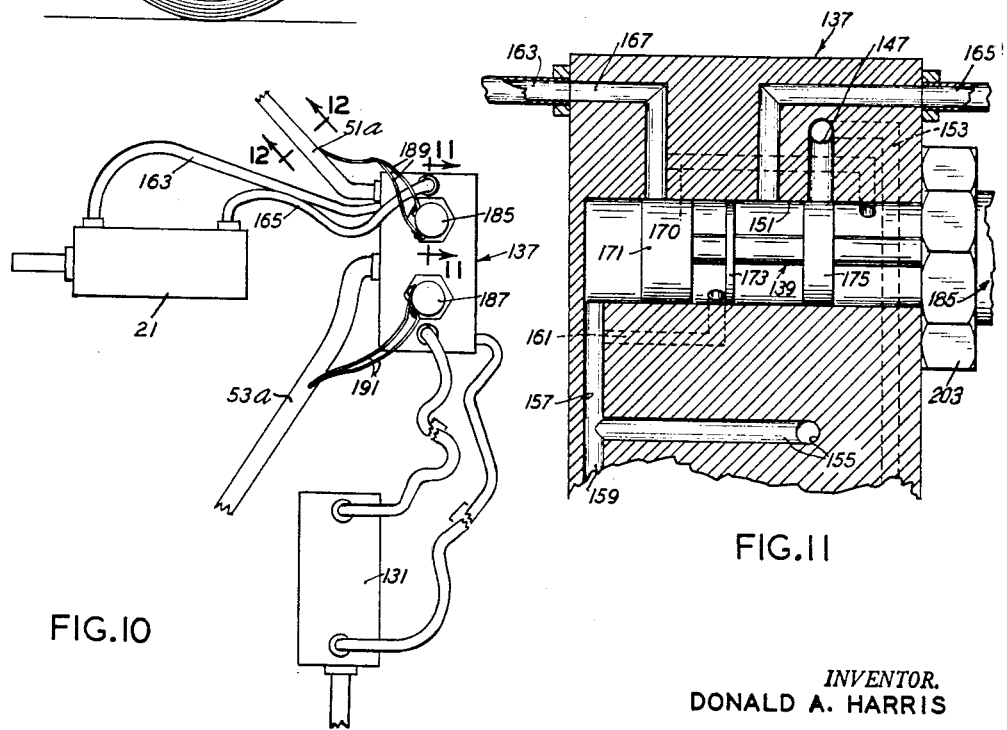
FIG. 10
FIG. 11
INVENTOR.
DONALD A. HARRIS
BY
Buckhorn, Cheatham and Blore
ATTORNEYS United States Patent Office 2,932,419
Patented Apr. 12, 1960

2,932,419

HOSE CONTROL ARRANGEMENT

Donald A. Harris, Vancouver, Wash., assignor, by mesne assignments, to Hyster Company, a corporation of Nevada Application January 18, 1957, Serial No. 634,871

3 Claims. (Cl. 214—652)

This invention relates to a lift truck and particularly to improvements in a take-up mechanism for taking up slack in a flexible element extending from the truck to the load carriage.

The present invention is primarily concerned with controlling the slack in hydraulic hoses which extend from a lift truck to a hydraulic cylinder on the carriage of the truck and which become slack during elevation of the carriage and extension of the truck mast. Heretofore, the common type of hose take-up mechanism has included a weighted traveling sheave movable along the outer upright structure of the truck under the influence of gravity to take up the slack in one or more hoses.

There have been some disadvantages in this type of take-up mechanism in that the weight must be made of considerable size to effect the desired movement of the hose and, secondly, the traveling sheave has had a tendency to bind on its guides because of the deposit and accumulation of dirt and foreign matter on the guides and sheave. When this occurs, the hose forms a loose loop which may be caught between the moving parts of the mast structure and severed or damaged.

It is a main object of the present invention to provide a lift truck having a hose take-up mechanism which is operable independently of the influence of gravity to take up slack in the hydraulic hoses connecting the truck to the load carriage.

It is another object of the present invention to provide such a mechanism which is compact and which does not materially interfere with the vision of the operator of the truck.

It is a further object of the invention to provide such a take-up mechanism which is operable to take up slack in the carriage hoses of both free lift and standard lift trucks.

Another object is to provide on a lift truck a take-up mechanism operable to take up slack in any flexible element extending from the truck to the carriage.

One form of the take-up mechanism of the present invention is characterized in that part thereof is mounted on the fixed uprights and part on the movable uprights and a pair of carriage hoses are so trained about the mechanism that the slack in the hoses is automatically and positively taken up upon movement of the carriage and extension of the mast.

Various other objects of the present invention will be apparent from the following description taken in connection with the accompanying drawings wherein:

Fig. 3 is an enlarged fragmentary perspective view taken in the direction toward the rear right-hand corner of the mast and more fully showing the structure of the take-up mechanism, and for convenience in illustration the carriage is shown in an elevated condition while the traveling sheave is in its initial position;

Fig. 4 is a sectional view taken along line 4—4 of Fig. 3, showing certain details of construction, parts being broken away for convenience in illustration;

Figs. 5, 6 and 7 are schematic views showing various stages in the operation of the take-up mechanism;

Fig. 8 is a schematic view showing a modified form of the invention.

Fig. 9 is a fragmentary side view similar to Fig. 1 but showing another construction;

Fig. 10 is a schematic view showing on an enlarged scale certain details of the arrangement in Fig. 9;

Fig. 11 is a sectional view on an enlarged scale taken along line 11—11 of Fig. 10;

Fig. 12 is a sectional view on an enlarged scale taken along line 12—12 of Fig. 10; and Fig. 13 is a sectional view of a solenoid unit for operating a valve member.

Figure 1:
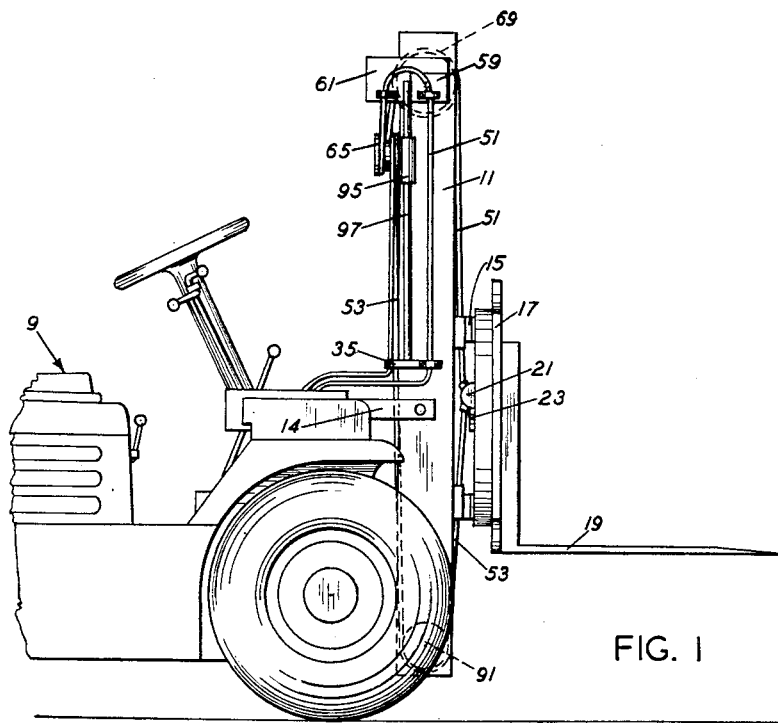
Fig. 1 is a fragmentary side view in elevation of a lift truck having a hose take-up mechanism with the present invention and showing the load carriage partly elevated.

Referring to the accompanying drawings, the truck 9 has a tiltable mast mounted on the front end thereof in conventional fashion. The mast comprises an outer upright structure which includes a pair of spaced uprights 11 and an inner upright structure which includes a pair of spaced uprights 13, Fig. 4, which is movably mounted within the outer uprights. A suitable mechanism 14 tilts the mast and a load carriage has a frame 15, Fig. 1, mounted in conventional fashion for movement along the inner uprights of the mast. The carriage includes a revolving apron 17, rotatably mounted on the frame 15 and carrying load forks 19. The apron is operated by one or more double acting piston and cylinder units, one numbered 21 being shown, in a manner similar to that disclosed in the Ehmann Patent 2,595,131. The unit 21 is mounted on the frame 15 of the carriage and drives the apron by gearing indicated at 23, Fig. 1. It is unimportant to the present invention what type of carriage is provided so long as it carries at least one hydraulic motor.

Figure 2:
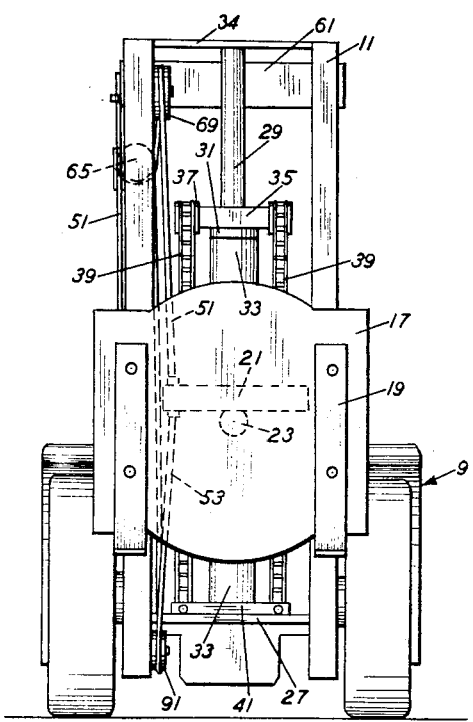
Fig. 2 is a front view of the truck.

A free lift ram unit is mounted on and between the fixed uprights by a bracket 27, Fig. 2, and may be of the type disclosed in the Lehmann Patent 2,598,566. The unit includes a tubular supply member, not shown, an inner cylinder 29, surrounding the supply member, an intermediate cylinder 31, and an outer cylinder 33. The inner cylinder is connected at its upper end to a cross brace 34 connecting the inner uprights, and the cylinder 31 carries a crosshead 35 supporting a pair of sprockets or sheaves 37. A pair of chains 39 are reeved over the sheaves 37 and are connected at one set of ends to the load carriage and at the other set of ends to the outer cylinder 33 by a bracket 41. Since the ram unit is of the free lift type, the intermediate cylinder 31 initially raises the carriage to the upper ends of the inner uprights without extension of the mast, that is, elevation of the inner uprights. Thereafter, the inner uprights are elevated in unison with the carriage.

The problem with which the present invention is concerned is the take up of slack in a pair of hoses 51 and 53, Fig. 1, which conduct hydraulic fluid to and exhaust fluid from the cylinder unit 21, and which are connected at one set of ends to the cylinder unit and at the opposite set of ends to a valve, not shown, on the truck.

Referring particularly to Fig. 3, the hose 51 is connected by a clamp 54 to a bracket 55 on one of the outer uprights 11 and extends upwardly and is connected by a clamp 57 and a plate 59 to a rear upper brace 61 of the outer uprights. The hose 51 is turned downwardly and is connected by a clamp 63 to the brace 61 and then is reeved or passed under a traveling guide unit which includes a single sheave 65. The hose then extends upwardly and is reeved over a fixed guide in the form of a sheave 69 which is rotatably mounted by a bracket 71, Fig. 4, on the upper end of the inner uprights 13. Hose 51 then extends downwardly where it is connected to the cylinder of unit 21. Although the hose is shown as being directly connected to the cylinder, it could as well be indirectly connected such as by a pipe or another hose.

The second hose 53 is connected by a clamp 81 to the bracket 55, and then extends upwardly and is trained or reeved over the traveling sheave 65 and then extends downwardly and is trained under a fixed guide in the form of a sheave 91 rotatably mounted on the lower portion of the inner uprights by a bracket 93, Fig. 3. The hose 53 then extends upwardly and is connected directly or indirectly to the cylinder of unit 21. For convenience both hoses 51 and 53 are shown connected to the same end of the cylinder, but it is to be understood that the hoses are meant to be in communication with the opposite ends of the piston within the cylinder.

The traveling sheave 65 is rotatably mounted on an arm 94, Fig. 4, which is fixed to a tubular slide 95 slidably fitting on a vertical guide bar 97. The guide bar is connected at its upper end to plate 59 and at its lower end to bracket 55 to be disposed in spaced relation to the outer uprights. This permits free sliding movement of the traveling sheave along the guide bar. The traveling sheave 65 rotates in a plane parallel to that of the uprights while the sheave 69 rotates in a plane normal to that of the uprights.

Referring particularly to Figs. 5, 6 and 7, the operation of the device is as follows. As the load carriage is elevated by the free lift ram along the inner uprights 13, without elevation of the inner uprights, the distance between the load carriage and the upper sheave 69 decreases and thus there is a tendency for the hose 51 to become slack. However, during such movement of the carriage, the distance between the carriage and the sheave 91 increases and thus the hose 53 pulls the sheave 65 downwardly to take up the slack in hose 51. This operation continues until the carriage reaches the upper end of the inner uprights, at which time the sheave 65 is in its lowermost position. The extent of movement of the traveling sheave is only half that of the carriage 15 because the hoses are trained over the traveling sheave. This accounts for the relatively short length of the guide bar 97.

When the carriage reaches its uppermost position on the inner uprights, the inner uprights together with the load carriage are then elevated, and this action decreases the distance between the lower sheave 91 and the traveling sheave 65 and tends to create slack in the hose 53. However, such inner upright movement also increases the distance between the sheave 69 and the traveling sheave, and thus the traveling sheave 65 is pulled upwardly by hose 51 to take up slack in hose 53. The traveling sheave finally reaches its uppermost position at the time of full extension of the uprights. Upon subsequent downward movement of the inner uprights and the load carriage, the reverse movement of the traveling sheave takes place.

It is thus apparent from the foregoing description that the present invention has provided a hose take-up mechanism which positively moves in opposite directions to take up the slack in the hose and is independent of the force of gravity and thus cannot become stuck. While the traveling guide unit is shown as including a single sheave, which is of double width for handling both hoses 51 and 53, this double width sheave could be replaced by a pair of single width sheaves disposed one above the other in a single plane. With this construction, the forces imposed on the sheaves would be in the same plane, rather than in laterally spaced planes as is the case with a double width sheave. Thus with two sheaves, there would be no need for the guide bar 97, since there would be no moment forces tending to tilt the sheaves away from a vertical plane as is the case when employing a double width sheave.

It is further pointed out that although the hoses 51 and 53 are shown as having length portions slightly inclined to the vertical in the figures, this is only for convenience in illustration, and in practice the sheaves have been so dimensioned that the lengths of the hoses are vertical. It is further pointed out that only a single hose could be employed if desired, and in such case the second hose could be replaced by a suitable cable for insuring the proper take-up of slack in the hose. It is further apparent that while the guides for the hose have been shown in the form of sheaves, they could assume other forms as well.

The hose take-up mechanism of the present invention is also capable of taking up the slack in the hoses of a standard lift truck. Referring particularly to Fig. 5, it will be apparent that if the inner uprights 13 were elevated a short distance, say one foot, such movement in a standard lift truck would cause a two foot upward movement of the carriage 15. Since the hose 51 is trained over the sheave 69, which moves upwardly one foot with the inner uprights, and since the hose 53 is trained over the sheave 91, which is also carried by the inner uprights, the upper sheave would be responsible for a two foot take-up in the hose 51 and the sheave 91 would be responsible for a two foot pay out of hose 53. Thus, the traveling sheave 65 would remain stationary. In fact, the entire movement of the carriage and the uprights would take place with the traveling sheave remaining stationary.

A modified form of the invention is disclosed in Fig. 8 and is intended for standard lift trucks. This form of the invention is similar to the form of the invention previously described, except that since no movement of the traveling sheave 65 is required for a standard lift truck, the sheave and its guide bar and associated parts have been eliminated in the Fig. 8 form of the invention and the hoses 51 and 53 are merely fixed at 101 and 103 to the outer uprights adjacent the upper end thereof.

Figs. 9 through 12 show a truck in which the carriage has two motors 21 and 131 instead of only a single motor as in Figs. 1 through 4. The motor 21 is for turning the apron 17 whereas the motor 131, which is mounted on the apron, is for operating a pivoted clamp arm 133 to clamp a load between the pivoted clamp arm and a fixed arm 135. It is actually unimportant for what purpose the motor 131 is employed and the use shown is only by way of example.

Instead of employing two hoses for each of motors 21 and 131, only two hoses 51a and 53a are provided for both motors. The slack take-up mechanism employed for hoses 51a and 53a is the same as in Figs. 1 and 2 as is apparent by the similar reference numerals on the drawings.

At the load carriage, the hoses 51a and 53a are connected to a manifold device in the form of a spool valve 137 which is mounted on the load carriage frame 15 and which per se is of common construction. The valve is a double valve unit having two valve members, one of which is shown in Fig. 11 and identified by the reference numeral 139.

The manner of conducting hydraulic fluid back and forth between the valve 137 and motor 21 will be explained, from which the connections between the valve and the motor 131 will be apparent. The hose 51a may be considered as the pressure hose and the hose 53a the discharge hose.

Referring to Fig. 11, hose 51a is connected to the valve 137 at a passage 147 leading to a chamber 151 containing the valve member 139. A branch passage 153 leads to the other unit of the valve. The discharge hose 53a is connected to the valve 137 at a passage 155 which has a branch passage 157 leading to the left-hand end of the chamber 151 of the valve member 139 and a branch passage 159 leading to the other unit of the valve. A branch passage 161 leads from the passage 157 and connects with the chamber 151 intermediate the ends thereof.

Referring to Figs. 10 and 11, a pair of conduits 163 and 165 connect the opposite ends of the cylinder of motor 21 to passages 167 and 169, respectively, of the valve 137. The passages 167 and 169 are connected with the valve chamber 151 intermediate the ends thereof as shown in Fig. 11. A branch passage 170 connects passage 167 with the right-hand end of the chamber 151.

The valve member 139 has three flanges 171, 173 and 175 so located that in the position of the valve member shown, the fluid in conduits 163 and 165 is in a locked condition so that the apron 17 is maintained in a fixed position. By shifting the valve member 139 one way, fluid will be supplied to one end and exhausted from the opposite end of the cylinder of the motor 21 to turn the apron 17 one way, and by shifting the valve element the opposite way the opposite result is achieved. Thus the apron may be rotated either way or held in any position of adjustment.

The cylinder of motor 131 is connected by slack flexible conduits 181 and 183 to the chamber of the other valve member of the valve 137 so that by appropriate operation of the other valve member, the arm 133 may be moved toward or away from the arm 135 or held in any position of adjustment. The slack in conduits 181 and 183 permits movement of the motor 131 which is on the apron, relative to the valve 137 which is on the carriage frame 15.

Movement of the valve members is selectively controlled by a pair of solenoids 185 and 187 the operation of which is controlled from the drivers compartment through appropriate switches, not shown. The switches are connected to the solenoids 185 and 187 by electrical conductors 189 and 191 respectively which are embedded in the outer layers 193 on the hoses 51a and 53a respectively as is best shown in the case of conductors 189 in Fig. 12. Each hose is shown as carrying four electrical conductors, although only two are employed. The unused conductors could be utilized for the solenoids of the valve members of additional motors if such were required. The electrical conductors could, of course, be separate from the hoses and trained over the reeving elements in the same manner as the hoses, or over separate reeving elements if desired. Apart from the slack take-up mechanism of Figs. 9 through 13, the invention relating to the hose having the embedded wires, and the associated solenoids and related parts is the invention of Robert C. Shoemaker and is disclosed in a copending application entitled "Hose Arrangement for Lift Truck."

For convenience, in the claims, the term "conductors" when used alone, will mean either a hose for conducting hydraulic fluid or a similar medium or an electrical conductor for conducting electric current. The term "flexible element" will cover a conductor or any other flexible connecting member, such as, a wire, rope, cable, chain, or the like, which may not be employed to conduct energy from the truck to the carriage, but may be employed to transfer energy, such as, for instance, the use of a pull cord for the mechanical control of a valve on the carriage. Also, such a flexible element could be used as the companion of a single hose if only one hose were required for operation of the motor or similar device.

Each of the solenoids 185 and 187 may be of the double solenoid type as shown in Fig. 13. Fig. 13 shows a cross section of the solenoid 185. The solenoid may be mounted on the body of the valve 137 in any convenient manner, one arrangement being shown. As shown, the body of the valve 137 is equipped with a threaded flange 201 on which a nut 203 is threaded to clamp down the flange 205 of a solenoid housing 207. The shaft 209 of the valve member 139 extends into the housing 207 and is equipped with a pair of armatures 211 and 213. Between the armatures, the shaft may be made of insulating material. A finger 215 is provided between the armatures and projects upwardly between a pair of springs 217 mounted in the housing to constrain the shaft 209 to assume the position so that the various elements of the spool valve are located as shown in Fig. 11. There is a coil 219 for the armatures 211 and a coil 221 for the armature 213. The coils may be energized by means of leads or conductors 189, previously mentioned. The ground conductors 231 of the coils may be grounded to the valve body or any other desired place.

It is evident that when the coil 219 is energized, the shaft 209 is going to shift one way and when the coil 221 is energized the shaft and associated spool members are going to shift the opposite way to accomplish the desired results.

Having described the invention in what is considered to be the preferred embodiment thereof, it is desired that it be understood that the invention is not to be limited other than by the provisions of the following claims.

I claim:

1. In a lift truck mast structure having a fixed outer upright structure comprising laterally spaced vertical members, a movable inner upright structure comprising laterally spaced vertical members, a load carriage movable along said inner upright structure, a hydraulic motor on said carriage, a pressure hose extending to said carriage from the body of the truck on which said mast structure is mounted, and an exhaust hose extending from such body to said carriage, a first sheave unit mounted on said outer upright for limited movement therealong in a vertical direction, said sheave unit being mounted rearwardly of one of the members of said outer upright structure with the plane of said sheave unit being disposed approximately parallel to the plane of said outer upright structure, a second sheave mounted on said inner upright structure at the upper portion thereof on the inside of the inner upright member associated with said one outer upright member, said second sheave having its plane approximately normal to the plane of said inner upright structure, a third sheave mounted on the just-mentioned member of said inner upright structure at the lower end thereof and on the inner side thereof, one of said hoses being trained downwardly and then upwardly around said first sheave unit and then upwardly and then downwardly around said second sheave and being connected to said carriage, the other hose being trained upwardly and then downwardly around said first sheave unit and then downwardly and upwardly around said third sheave and then being connected to said carriage, so that movement of said carriage will cause movement of said hoses to appropriately move said first sheave unit to prevent the formation of slack in said hoses.

2. In a lift truck mast structure having a fixed outer upright structure comprising laterally spaced vertical members, a movable inner upright structure comprising laterally spaced vertical members, a load carriage movable along said inner upright structure, a hydraulic motor on said carriage, a pressure hose extending to said carriage from the body of the truck on which said mast structure is mounted, and an exhaust hose extending from such body to said carriage, a first sheave means mounted on said outer upright for limited movement therealong in a vertical direction, a second sheave mounted on said inner upright structure at the upper portion thereof and adjacent said one member of said outer upright structure, a third sheave mounted on the lower end of said inner upright structure at a place adjacent said one member of said outer upright structure, one of said hoses being trained downwardly and then upwardly around said first sheave means and then upwardly and then downwardly around said second sheave and being connected to said carriage, the other hose being trained upwardly and then downwardly around said first sheave means and then downwardly and upwardly around said third sheave and then connected to said carriage, the plane of said first sheave means being angularly disposed with respect to the plane of said third sheave so that said other hose may readily pass from said first sheave means to said third sheave.

3. In a lift truck mast structure having a fixed outer upright structure comprising laterally spaced vertical members, a movable inner upright structure comprising laterally spaced vertical members, a load carriage movable along said inner upright structure, a hydraulic motor on said carriage, a pressure hose extending to said carriage from the body of the truck on which said mast structure is mounted, and an exhaust hose extending from such body to said carriage, a first sheave means mounted on said outer upright for limited movement therealong in a vertical direction, a second sheave mounted on said inner upright structure at the upper portion thereof and adjacent said one member of said outer upright structure, a third sheave mounted on the lower end of said inner upright structure at a place adjacent said one member of said outer upright structure, one of said hoses being trained downwardly and then upwardly around said first sheave means and then upwardly and then downwardly around said second sheave and being connected to said carriage, the other hose being trained upwardly and then downwardly around said first sheave means and then downwardly and upwardly around said third sheave and then connected to said carriage.

References Cited in the file of this patent
UNITED STATES PATENTS

| | | |
|---|---|---|
| 467,746 | Brown | Jan. 26, 1892 |
| 728,495 | Otto | May 19, 1903 |
| 2,724,520 | Overbeck | Nov. 22, 1955 |
| 2,736,445 | Hoban | Feb. 28, 1956 |
| 2,754,018 | Schroeder | July 10, 1956 |